March 13, 1951 — H. P. RUF — 2,545,212
SKEINING MACHINE
Filed Aug. 22, 1945
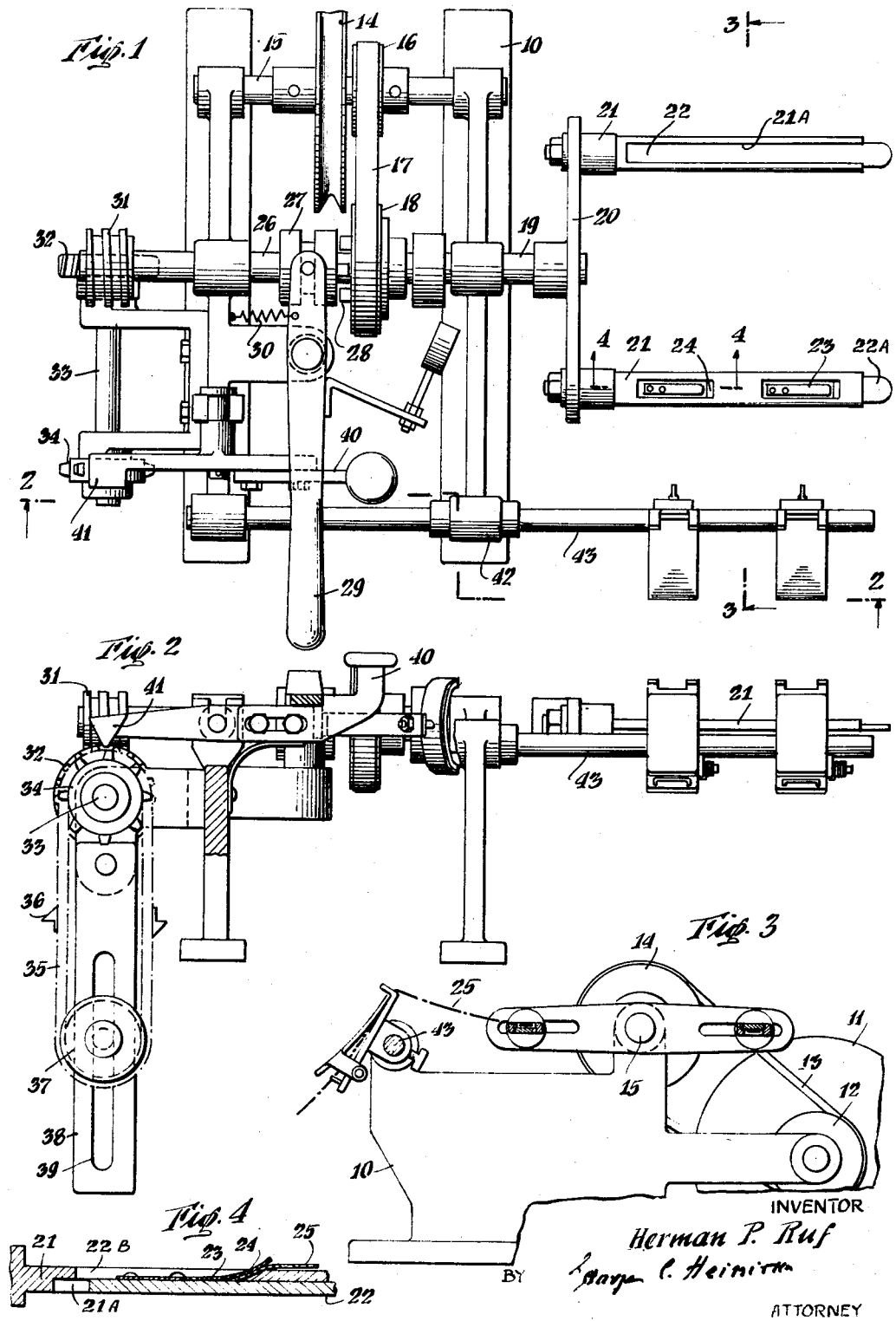
INVENTOR
Herman P. Ruf
BY George C. Heinrich
ATTORNEY Patented Mar. 13, 1951

2,545,212

UNITED STATES PATENT OFFICE 2,545,212

SKEINING MACHINE

Herman P. Ruf, New York, N. Y.

Application August 22, 1945, Serial No. 611,981

2 Claims. (Cl. 242—53)

My invention relates to a new and useful skeining machine, and it is the principal object of the invention to measure the length of a thread, yarn or ribbon after it is taken from the reel, so that always a proper and predetermined length can be cut off.

Another object of my invention is the provision of a special ribbon clamping device combined with the skeining machine.

Further object and advantages of my machine are its simplicity of construction and inexpensive and compact mounting.

These and other objects and advantages of my invention will become more fully known as the description thereof proceeds, and will then be specifically defined in the appended claims.

In the accompanying drawing forming a material part of this disclosure:

Fig. 1 is a front elevation of a skeining machine constructed according to my invention.

Fig. 2 is a section on line 2—2 of Fig. 1.

Fig. 3 is a section on line 3—3 of Fig. 1.

Fig. 4 is a sectional view of a ribbon clamping device combined with my machine, the section being taken on line 4—4 of Fig. 1.

As illustrated, the machine bed 10 carries a motor 11 with its belt pulley 12 driving by means of a belt 13, a pulley 14 on shaft 15. The shaft 15 carries also a smaller belt pulley 16 juxtaposed to pulley 14 over which a belt 17 is guided, also guided over a pulley 18 below shaft 15 on a spindle 19 extending beyond the machine frame and carrying a cross head or frame 20 to which are bolted or otherwise secured the ends of the arms 21.

The arms 21 extend substantially parallel to spindle 19 and are formed with the longitudinally extending dovetail slots 21A in which the elongated slide members 22 are slidable, the slide members 22 having grip portions 22A extending beyond the ends of arms 21 and affording a purchase by which they may be manually engaged for sliding actuation relative to arms 21.

Arms 21 are further formed with the recesses 22B extending longitudinally thereof and from the outside surface thereof opposite the slot 21A down to and in communication with said slot 21A and the slide member 22 located therein.

Located entirely within the recesses 22B in one position of slide member 22 as best illustrated in Figures 1 and 3 are the clamp members 23 which are leaf springs firmly fastened at one of their ends to the slide member 22 and then describing a rather flat S curve, in the sense that they first curve upward from slide member 22, then extend substantially flatly for a distance and then curve upward again adjacent their ends. The upward curve adjacent the free ends of the springs 23 is for the purpose of facilitating their riding up out of the recesses 22B along the bevelled walls 24 thereof upon sliding of the slide member 22. The upward curve of the springs 23 adjacent their fastening to member 22 is equal in height to the bevelled walls 24, so that the flat portion of each spring 23 between the two curves thereof will be flat on and frictionally engage the outside surface of arm 21, providing a convenient clamp means for a ribbon 25 or other material to be skeined by the machine.

The machine frame carries in alignment with the spindle 19 a shaft 26 carrying a clutch member 27 adapted to be engaged by a clutch member 28 on spindle 19 when shifted by means of a clutch lever 29 cushioned by a spring 30, the shaft 26 carries at its outer end a worm 31 in mesh with a gear 32 at the end of a shaft 33 which carries at its other end a sprocket wheel 34 over which is guided a chain 35 having stop members 36 suitably arranged thereon determining the length of the material according to the chain at the time carried over the sprocket. A guiding member 38 having a slot 39 can be lengthened or shortened according to the length of the chain used by the suitable operation of knob 37. A treadle 40 has at its outer end a stop member 41 engaging the suitable stops 36 and can be adjustably moved along a shaft 43 suitably arranged on the machine frame in bearings 42 which carries the skein guides.

The use and operation of my machine will be entirely clear from the above description by simultaneously having reference to the drawing.

It will be understood that I have described and shown the preferred form of my invention only as one example of the many possible ways to practically construct the same, and that I may make such changes in the general arrangement of the machine and in the construction of its minor details as come within the scope of the appended claims without departure from the spirit of my invention and the principles involved.

Having thus described my invention, what I claim as new is:

1. In a skeining machine, in combination with a spindle and means for rotating said spindle, a plurality of arms connected to said spindle and extending in substantially parallel relation therewith, at least one of said arms comprising a slide member slidable relatively thereto and located interiorly of said arm, said arm being formed with a recess extending longitudinally along an outside surface thereof and in open communication with said member, said slide member further comprising a clamp member located entirely within said recess in one position of said slide member and in frictional contact with an outside surface of said arm in another position of said slide member.

2. In a skeining machine according to claim 1, said clamp member being a leaf spring curved so as to ride up out of said recess upon the sliding of said slide member.

HERMAN P. RUF.

REFERENCES CITED

The following references are of record in the file of this patent:

UNITED STATES PATENTS

| Number | Name | Date |
|---|---|---|
| 1,066,143 | Phillips | July 1, 1913 |